United States Patent
Okubo

(10) Patent No.: US 9,455,889 B1
(45) Date of Patent: Sep. 27, 2016

(54) MANAGING A MOBILE COMPUTING DEVICE INVENTORY LIST

(71) Applicant: FUJITSU LIMITED, Kawasaki-shi, Kanagawa (JP)

(72) Inventor: Yuko Okubo, Berkeley, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/728,649

(22) Filed: Jun. 2, 2015

(51) Int. Cl.
- *H04W 72/00* (2009.01)
- *H04L 12/26* (2006.01)
- *H04L 12/24* (2006.01)
- *H04W 24/06* (2009.01)

(52) U.S. Cl.
CPC ......... *H04L 43/065* (2013.01); *H04L 41/0869* (2013.01); *H04L 43/045* (2013.01); *H04W 24/06* (2013.01)

(58) Field of Classification Search
CPC .............................. G06F 1/189; B65G 1/0492
USPC ........... 455/419, 41.2, 418, 566, 457, 550.1, 455/574, 406, 456.1; 701/2; 380/47.35
See application file for complete search history.

(56) References Cited

U.S. PATENT DOCUMENTS

| | | | |
|---|---|---|---|
| 8,320,110 B2 | 11/2012 | Chen | |
| 8,373,383 B2 | 2/2013 | Dandekar et al. | |
| 2001/0029178 A1* | 10/2001 | Criss | G06F 8/65 455/419 |
| 2011/0264927 A1* | 10/2011 | Dearborn | G06F 1/1632 713/300 |

* cited by examiner

Primary Examiner — Kiet Doan
(74) *Attorney, Agent, or Firm* — Maschoff Brennan

(57) ABSTRACT

A method to manage an inventory list of multiple mobile computing devices is disclosed. The method may include transmitting a status-check signal over a network to each of the mobile computing devices of an inventory list at a scheduled time to perform a status check on the mobile computing devices. The method may include providing an indication in the inventory list that a mobile computing device of the mobile computing devices has limited functionality in response to determining that the mobile computing device does not enter the state of operation. The method may include transmitting the inventory list to a mobile storage cart over the network. The mobile storage cart may store and charge the mobile computing devices. The method may also include presenting the inventory list on a display screen of the mobile storage cart with the indication that the mobile computing device has limited functionality.

20 Claims, 6 Drawing Sheets

| Inventory List | |
|---|---|
| 1. OK | 2. OK |
| 3. Check | 4. OK |
| 5. OK | 6. OK |
| 7. OK | 8. Check |
| 9. Check | 10. OK |
| 11. OK | 12. Check |
| 13. OK | 14. OK |
| 15. OK | 16. OK |
| 17. Check | 18. OK |
| 19. Check | 20. OK |

*Fig. 6*

MANAGING A MOBILE COMPUTING DEVICE INVENTORY LIST

FIELD

The embodiments discussed in the present disclosure are related to managing a mobile computing device inventory list.

BACKGROUND

Mobile computing devices are increasingly being used in classrooms and other settings to facilitate learning. For example, in classrooms one-to-one computing, in which each student receives a mobile computing device for network access and digital learning, is becoming more common with the rise of lower-cost mobile computing devices, such as tablets, notebooks, iPads®, iPods®, and other mobile computing devices.

The subject matter claimed in the present disclosure is not limited to embodiments that solve any disadvantages or that operate only in environments such as those described above. Rather, this background is only provided to illustrate one example technology area where some embodiments described may be practiced. Furthermore, unless otherwise indicated, the materials described in the background section are not prior art to the claims in the present application and are not admitted to be prior art by inclusion in this section.

SUMMARY

According to an aspect of an embodiment, a method to manage an inventory list of multiple mobile computing devices stored on a mobile storage cart is described in this application. The method may include transmitting a status-check signal over a network to each of multiple mobile computing devices of an inventory list at a scheduled time to perform a status check on the mobile computing devices. The status-check signal may indicate to each of the mobile computing devices to enter a state of operation that allows communication over the network. The method may also include determining whether each of the mobile computing devices enter the state of operation in response to transmission of the status-check signal to each of the mobile computing devices.

Additionally, the method may include providing an indication in the inventory list that a mobile computing device has limited functionality in response to determining that the mobile computing device of the mobile computing devices does not enter the state of operation. Moreover, the method may include transmitting the inventory list to a mobile storage cart over the network. The mobile storage cart may store and charge the mobile computing devices. Further, the method may include presenting the inventory list on a display screen of the mobile storage cart with the indication that the mobile computing device has limited functionality.

The object and advantages of the implementations will be realized and achieved at least by the elements, features, and combinations particularly pointed out in the claims.

It is to be understood that both the foregoing general description and the following detailed description are given as examples and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 6 is an example inventory list that may be presented on a display screen of a mobile storage cart.

DESCRIPTION OF EMBODIMENTS

A classroom, such as elementary classroom may include multiple mobile computing devices, such as laptops, tablets, etc., that may be used for the instruction of the students in the classroom. To help to ensure that the mobile computing devices are ready for student use, a teacher in the classroom may frequently check the mobile computing devices. Particularly, the teacher may check whether the mobile computing devices turn on, connect to a network, or have any software issues. When a particular mobile computing device has limited functionality, it may result in the teacher identifying and trouble-shooting any problems him or herself, which may be time-consuming and difficult. Additionally, keeping track of the mobile computing devices that have limited functionality may be particularly time-consuming and onerous when the teacher has a class that includes a large number of mobile computing devices. Further, if a particular mobile computing device is not ready to use but has not been identified as having limited functionality, a student may pick up the mobile computing device, try to use it, and have to return it upon discovering it does not work properly, which may waste time and lead to frustration.

Embodiments described in the present disclosure may be used to automatically manage an inventory list of mobile computing devices. In some embodiments, the mobile computing devices may be stored on a mobile storage cart in, for example, a classroom or other environment. In some embodiments, mobile computing devices that have limited functionality may be determined, indications of limited functionality may be provided in the inventory list, and the inventory list may be presented to a user of the mobile computing devices, for example, a student or a teacher. The user may thus avoid a particular mobile computing device that has limited functionality. In some embodiments, the inventory list may also be provided to a party that repairs the mobile computing devices or that coordinates repair of the mobile computing devices, for example, a manufacturer of the mobile computing devices or a school's information technology (IT) office.

Figure 1:
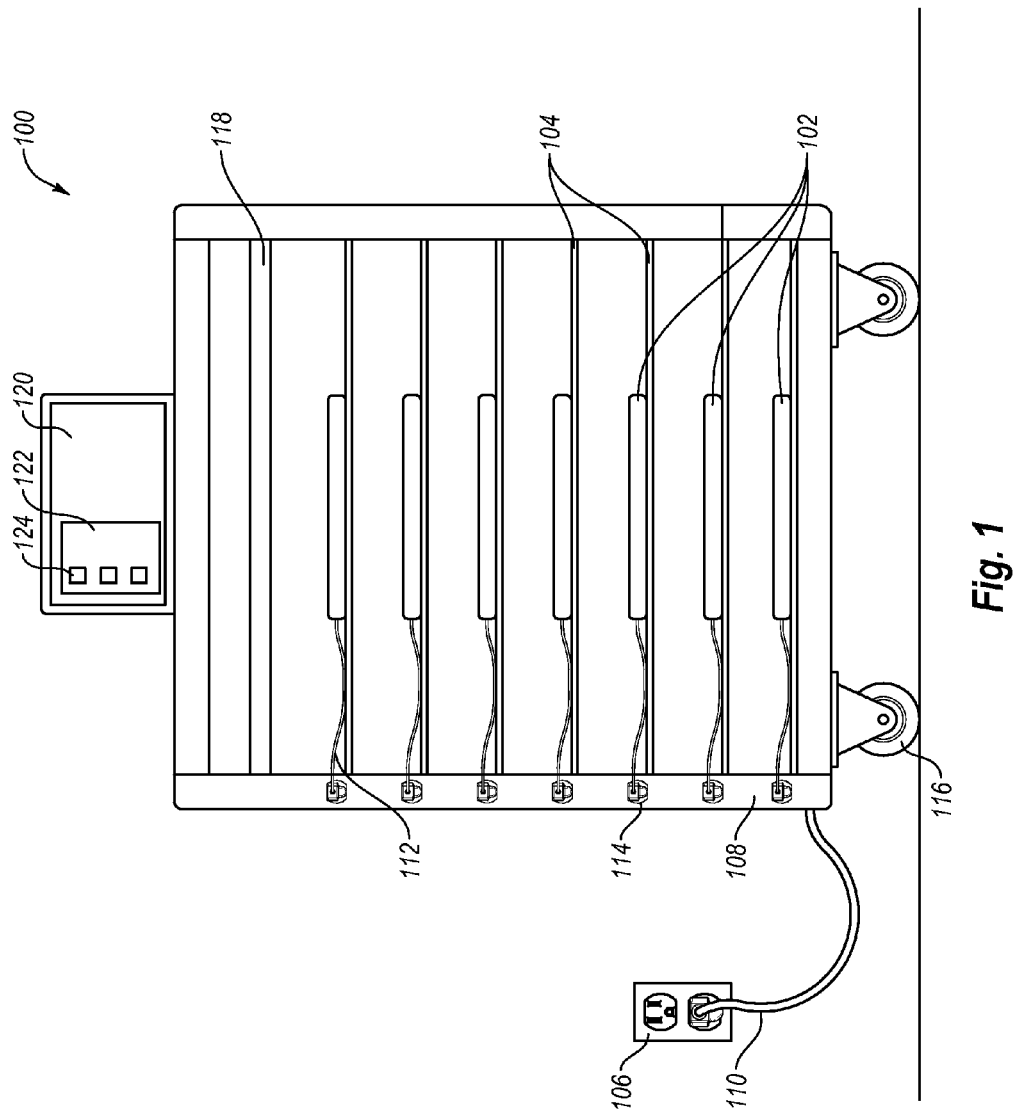
FIG. 1 illustrates an example mobile storage cart.

FIG. 1 illustrates an example mobile storage cart 100, arranged in accordance with at least one embodiment described in the present disclosure. In some embodiments, the mobile storage cart 100 may be configured to store mobile computing devices 102. In some embodiments, the mobile computing devices 102 may be stored, for example, in one or more drawers or on one or more shelves 104 of the mobile storage cart 100.

In some embodiments, the mobile storage cart 100 may include hardware to provide power to the mobile computing devices 102. In these and other embodiments, the mobile storage cart 100 may be connected to an external power supply 106 to provide power to the mobile computing devices 102. The mobile storage cart 100 may provide power to the mobile computing devices 102 in numerous ways. For example, the mobile storage cart 100 may have an electrical unit 108, and the electrical unit 108 may have an electrical cord 110, which may be connected to the external power supply 106. In some embodiments, power cords 112 of the mobile computing devices 102 may be inserted into electrical receptacles 114 located on the electrical units 108, which may allow the mobile computing devices 102 to charge their batteries.

In some embodiments, the mobile storage cart 100 may include one or more wheels 116 disposed on a bottom on the mobile storage cart 100. In some embodiments, the mobile storage cart 100 may be easily moved around a building, such as a classroom or school to allow people easy access to the mobile computing devices 102 when the mobile computing devices 102 are charged and ready to use.

In some embodiments, the mobile computing devices 102 may include laptop computers, tablet computers, iPads®, iPods®, or any other mobile computing devices. In some embodiments, the mobile computing devices 102 may include a memory, a processor, and network communication capabilities.

In some embodiments, the mobile storage cart 100 may include a computing system 118 In some embodiments, the computing system 118 may manage an inventory list of the mobile computing devices 102 stored on the mobile storage cart 100. To manage the inventory list, the computing system 118 may transmit a status-check signal over a network to each of the mobile computing devices 102 at a scheduled time to perform a status check on the mobile computing devices 102. The computing system 118 may determine whether each of the mobile computing devices 102 enter the state of operation in response to transmission of the status-check signal to each of the mobile computing devices. In response to determining that the particular mobile computing device 102 does not enter the state of operation, the computing system 118 may provide an indication in the inventory list that a particular mobile computing device 102 of the mobile computing devices 102 has limited functionality. In some embodiments, in response to determining that the particular mobile computing device 102 enters the state of operation, the computing system 118 may perform a software diagnostic test on the particular mobile computing device 102 and may provide an indication in the inventory list of the particular mobile that the particular mobile computing device 102 has limited functionality or is ready to use, based on the results of the software diagnostic test. In some embodiments, the computing system 118 may transmit the inventory list to a display screen 120 disposed on the mobile storage cart 100.

In some embodiments, the display screen 120 may be communicatively coupled with the computing system 118 for presenting an inventory list of the mobile computing devices 102 stored on the mobile storage cart 100. In some embodiments, the display screen 120 may be disposed at any suitable location on the mobile storage cart 100. For example, the display screen 120 may be disposed on a top or a side of the mobile storage cart 100. In some embodiments, the display screen 120 may be communicatively coupled with the computing system 118

In some embodiments, the display screen 120 may include a user interface 122 that allows the user to interact with the computing system 118 and perform tasks associated with management of the inventory list. For example, the user may select or input into a field 124 of the user interface 122 a scheduled time to perform the status check on the mobile computing devices 102. The display screen may provide the scheduled time to the computing system 118. Based on the scheduled time, the computing system 118 may transmit the status check signal to the mobile computing devices 102 at the scheduled time. In some embodiments, the display screen 120 may be touch-sensitive to provide the user interface 122.

Modifications, additions, or omissions may be made to the mobile storage cart 100 without departing from the scope of the present disclosure. For example, in some embodiments, the mobile storage cart 100 may not include the display screen 120. In these and other embodiments, the inventory list may be presented on another electronic device. Alternately or additionally, the user interface that was presented on the display screen 120 may be presented on another electronic device and information provided by the user interface may be sent to the computing system 118 of the mobile storage cart 100. In some embodiments, the information provided by the user interface may be sent to the computing system 118 via a network.

Figure 2:
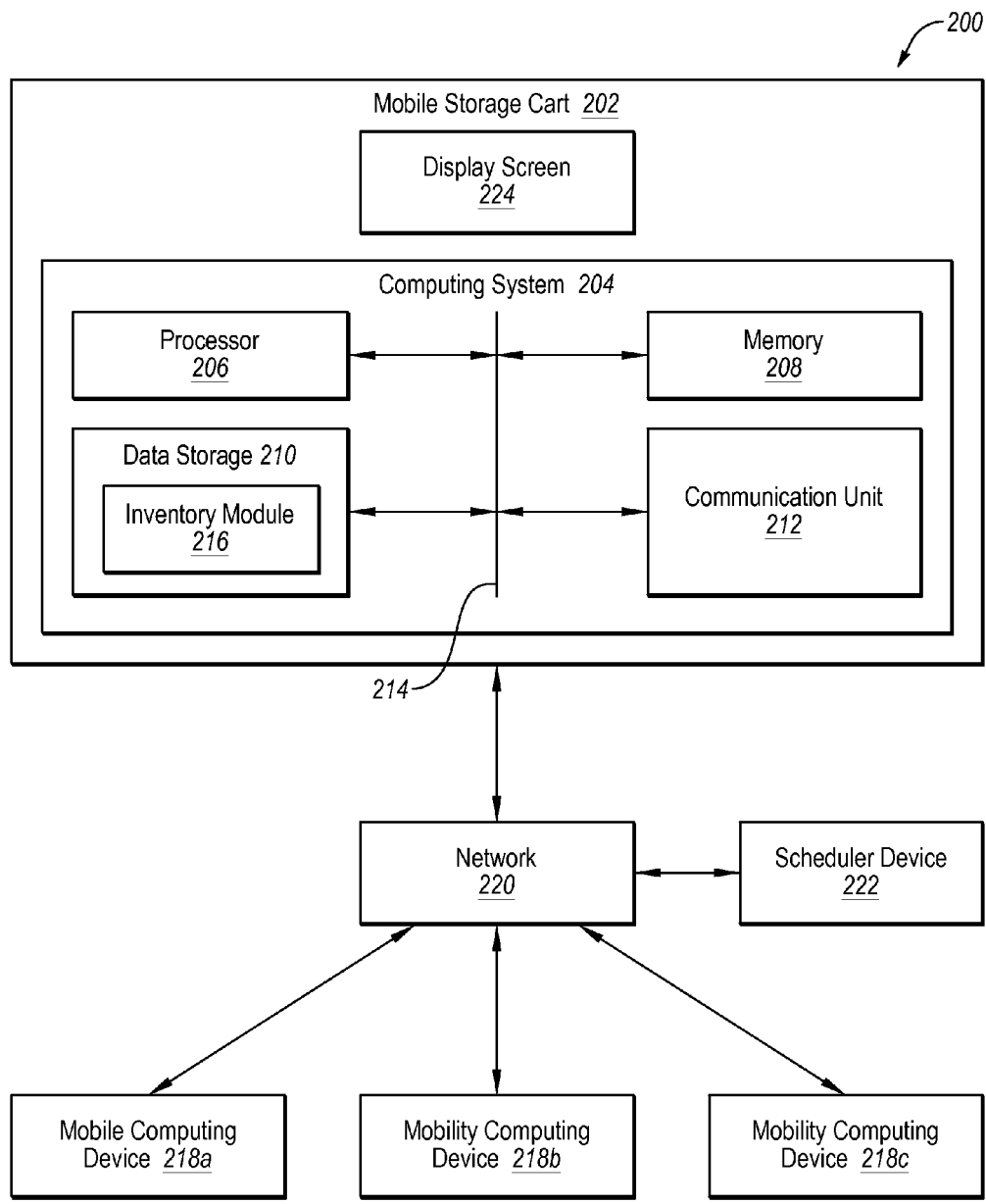
FIG. 2 is a block diagram of an example inventory list management system.

FIG. 2 is a block diagram of an example inventory list management system (ILM system) 200, arranged in accordance with at least one embodiment described in the present disclosure. The ILM system 200 may include a mobile storage cart 202 that stores mobile computing devices 218. In some embodiments, the mobile storage cart 202 may include or correspond to the mobile storage cart 100 of FIG. 1. In some embodiments, the mobile storage cart 202 may include a computing system 204. In these and other embodiments, the computing system 204 may include or correspond to the computing system 118 of FIG. 1.

In some embodiments, the computing system 204 may include a processor 206, a memory 208, a data storage 210, and a communication unit 212. In some embodiments, the processor 206, the memory 209, the data storage 210, and the communication unit 212 may be communicatively coupled by a bus 214. The bus 214 may include, but is not limited to, a controller area network (CAN) bus, a memory bus, a storage interface bus, a bus/interface controller, an interface bus, or the like or any combination thereof.

In general, the processor 206 may include any suitable special-purpose or general-purpose computer, computing entity, or processing device including various computer hardware or software modules and may be configured to execute instructions stored on any applicable computer-readable storage media. For example, the processor 206 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 206 may include any number of processors configured to perform, individually or collectively, any number of operations described in the present disclosure. Additionally, one or more of the processors 206 may be present on one or more different electronic devices.

In some embodiments, the processor 206 may interpret and/or execute program instructions and/or process data stored in the memory 208, the data storage 210, or the memory 208 and the data storage 210. In some embodiments, the processor 206 may fetch program instructions from the data storage 210 and load the program instructions in the memory 208. In some embodiments, after the program instructions are loaded into memory 208, the processor 206 may execute the program instructions.

For example, in some embodiments, an inventory module 216 may be included in the data storage 210 as program instructions. In some embodiments, the inventory module 216 may be configured to manage an inventory list of a first mobile computing device 218a, a second mobile computing device 218b, and a third mobile computing device 218c, referred to in the present disclosure collectively as the mobile computing device(s) 218, stored on the mobile storage cart 202. In some embodiments, all or the majority of the operations related to management of the inventory list of mobile computing devices 218 may be associated with the inventory module 216. The mobile computing devices 218 may include or correspond to the mobile computing devices 102 of FIG. 1. The processor 206 may fetch the program instructions of the inventory module 216 from the data storage 210 and may load the program instructions of the inventory module 216 in the memory 208. After the program instructions of the inventory module 216 are loaded into memory 208, the processor 206 may execute the program instructions such that the computing system 204 may implement the operations associated with the inventory module 216 as directed by the instructions.

The memory 208 and the data storage 210 may include computer-readable storage media for carrying or having computer-executable instructions or data structures stored thereon. Such computer-readable storage media may include any available media that may be accessed by a general-purpose or special-purpose computer, such as the processor 206. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 206 to perform a certain operation or group of operations.

In some embodiments, the mobile computing devices 218 may be connected to the computing system 204 via a network 220. In these and other embodiments, the network 220 may include a wired or wireless network, and may have any suitable configuration, such as a star configuration, a token ring configuration, or other configurations. Furthermore, in some embodiments, the network 220 may include an Ethernet network, a local area network (LAN), a wide area network (WAN) (e.g., the Internet), and/or other interconnected data paths across which multiple devices may communicate. In some embodiments, the network 220 may include a peer-to-peer network. In some embodiments, the network 220 may also be coupled to or include portions of a telecommunications network that may enable communication of data in a variety of different communication protocols.

In some embodiments, the network 220 may include BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 220 may enable communication via a standard-based protocol such as smart energy profile (SEP), Echonet Lite, OpenADR, or another suitable protocol (e.g., wireless fidelity (Wi-Fi), ZigBee, HomePlug Green, etc.).

In some embodiments, the communication unit 212 may be configured to transmit data to and receive data from the mobile computing devices 218 and/or a scheduler device 222 via the network 220. In some embodiments, the communication unit 212 may also be configured to transmit and receive data from a display screen 224. In some embodiments, the display screen may include or correspond to the display screen 120 of FIG. 1. In some embodiments, the inventory module 216 may be configured to send and receive data via the communication unit 212.

In some embodiments, the communication unit 212 may include a port for direct physical connection to the network 220 and/or another communication channel. For example, the communication unit 212 may include a universal serial bus (USB) port, a secure digital (SD) port, a category 5 cable (CAT-5) port, or similar port for wired communication with another device. In some embodiments, the communication unit 212 may include a wireless transceiver for exchanging data with the mobile computing devices 218 or other communication channels using one or more wireless communication methods, including IEEE 802.11, IEEE 802.16, BLUETOOTH®, or another suitable wireless communication method.

In some embodiments, the communication unit 212 may include a cellular communications transceiver for sending and receiving data over a cellular communications network including via SMS, MMS, HTTP, direct data connection, WAP, e-mail, or another suitable type of electronic communication. The communication unit 212 may also provide other conventional connections to the network 220 for distribution of files or media objects using standard network protocols including transmission control protocol/internet protocol (TCP/IP), HTTP, HTTP secure (HTTPS), and simple mail transfer protocol (SMTP).

In some embodiments, the inventory module 216 may be configured to receive a scheduled time to perform a status check on the mobile computing devices 218 from a user of the mobile computing devices 218. In some embodiments, the user may input the scheduled time with the scheduler device 222 connected to the network 220. In some embodiments, the scheduler device 222 may include a user device such as a desktop computer, a laptop computer, a tablet computer, a mobile phone, a smartphone, a personal digital assistant (PDA), a wearable device, or other user device. In some embodiments, the inventory module 216 may be configured to automatically set the scheduled time without user input.

An example of how the inventory module 216 may manage an inventory list of the mobile computing devices 218 stored on the mobile storage cart 202 is now provided. The inventory module 216 may transmit a status-check signal over the network 220 to the mobile computing devices 218a, 218b, and 218c via the communication unit 212. In these and other embodiments, the inventory module 216 may transmit the status-check signal at the scheduled time to perform the status check on the mobile computing devices 218a, 218b, and 218c. The inventory module 216 may determine whether the mobile computing devices 218a, 218b, and 218c enter the state of operation in response to transmission of the status-check signal.

One or more of the mobile computing devices 218 may fail to enter the state of operation in response to transmission of the status-check signal. For example, the mobile computing device 218a may fail to enter the state of operation in response to transmission of the status-check signal. In response to the mobile computing device 218a failing to enter the state of operation in response to transmission of the status-check, the inventory module 216 may determine that the mobile computing device 218a has limited functionality. The inventory module 216 may provide an indication in the inventory list that the mobile computing device 218a has limited functionality in response to determining that the mobile computing device 218a does not enter the state of operation.

On the other hand, one or more of the mobile computing devices 218 may enter the state of operation in response to transmission of the status-check signal. For example, the mobile computing devices 218b and 218c may enter the state of operation in response to transmission of the status-check signal. In response to determining that the mobile computing devices 218b and 218c enter the state of operation, the inventory module 216 may perform a software diagnostic test on the mobile computing devices 218b and 218c.

The inventory module 216 may determine if the mobile computing devices 218b and 218c have one or more software problems based on results of the software diagnostic test. For example, the inventory module 216 may determine that the mobile computing device 218b has the software problems based on the results of the software diagnostic test run on the mobile computing device 218b. The inventory module 216 may also determine that the mobile computing device 218c does not have any software problems based on the results of the software diagnostic test run on the mobile computing device 218c. In response to the inventory module 216 determining that the mobile computing device 218b has the software problems, the inventory module 216 may provide an indication in the inventory list that the mobile computing device 218b has limited functionality. In response to the inventory module 216 determining that the mobile computing device 218c does not have the software problems, the inventory module 216 may provide an indication in the inventory list that the mobile computing device 218c is ready to use. In some embodiments, the inventory module 216 may transmit the inventory list to the display screen 224 via the communication unit 212.

Modifications, additions, or omissions may be made to the ILM system 200 without departing from the scope of the present disclosure. For example, in some embodiments, the ILM system 200 may include any number of other components that may not be explicitly illustrated or described. For example, the ILM system 200 may not include the scheduler device 222 or the display screen 224. Alternately or additionally, the ILM system 200 may include more or less than the first, second, and third mobile computing devices 218. For example, the ILM system 200 may include 1, 2, 5, 10, 20, 30, 50 or more mobile computing devices 218.

Figure 3:
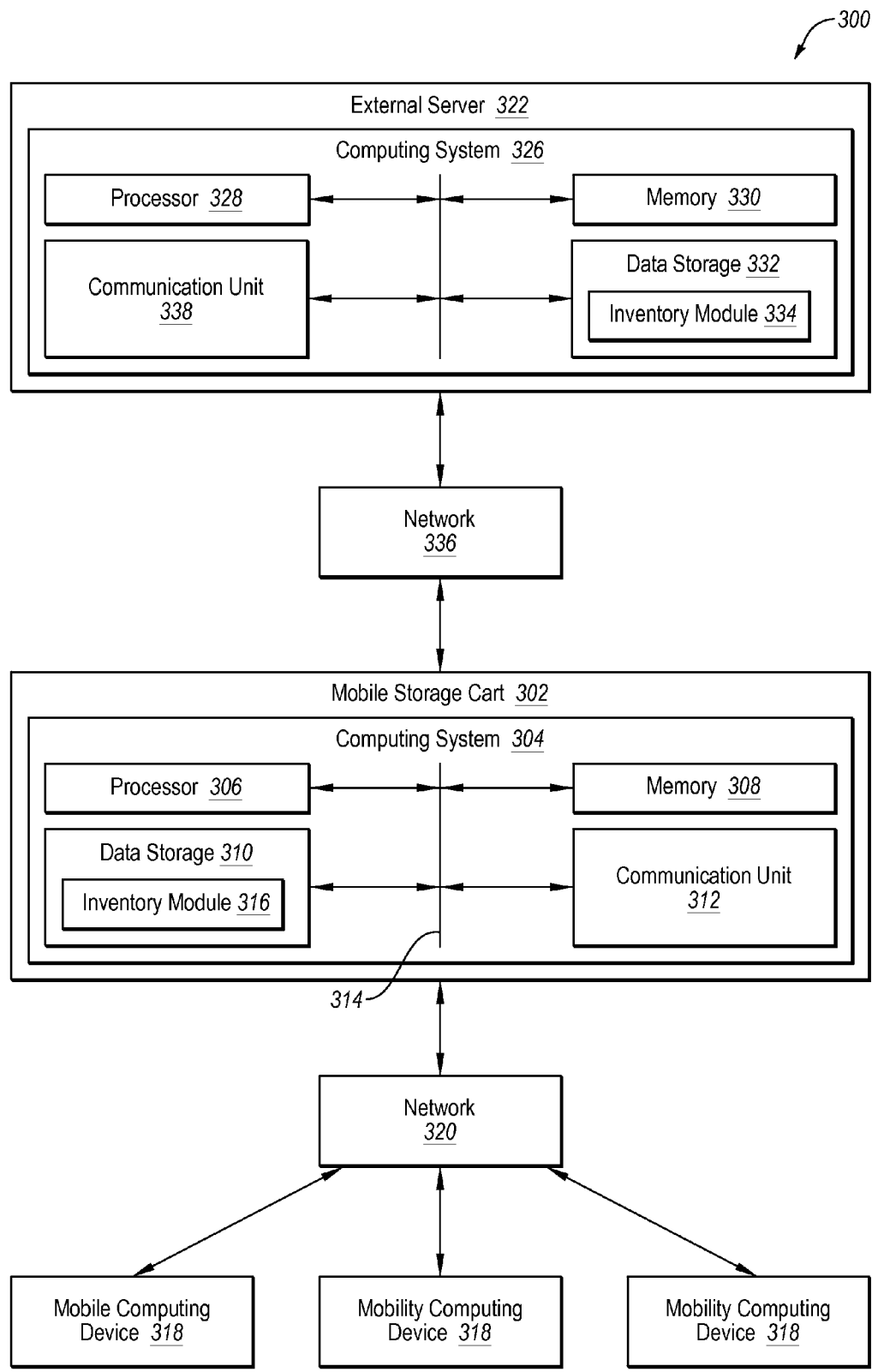
FIG. 3 is a block diagram of another example inventory list management system.

FIG. 3 illustrates a block diagram of another example inventory list management (ILM) system 300, arranged in accordance with at least one embodiment described in the present disclosure. In some embodiments, the ILM system 300 may include mobile computing devices 318, network 320, mobile storage cart 302, computing system 304, processor 306, memory 308, data storage 310, communication unit 312, inventory module 316, and bus 314. The mobile computing devices 318, network 320, mobile storage cart 302, computing system 304, processor 306, memory 308, data storage 310, communication unit 312, inventory module 316, and the bus 314 may include or correspond to the mobile computing devices 218, network 220, mobile storage cart 202, computing system 204, processor 206, memory 208, data storage 210, communication unit 212, inventory module 216, or the bus 214 of FIG. 2. However, in the inventory list management system 300, one or more operations associated with the inventory module 316 may be associated with the inventory module 334 on the computing system 326 of an external server 322 and may be implemented by the computing system 326.

Figure 5:
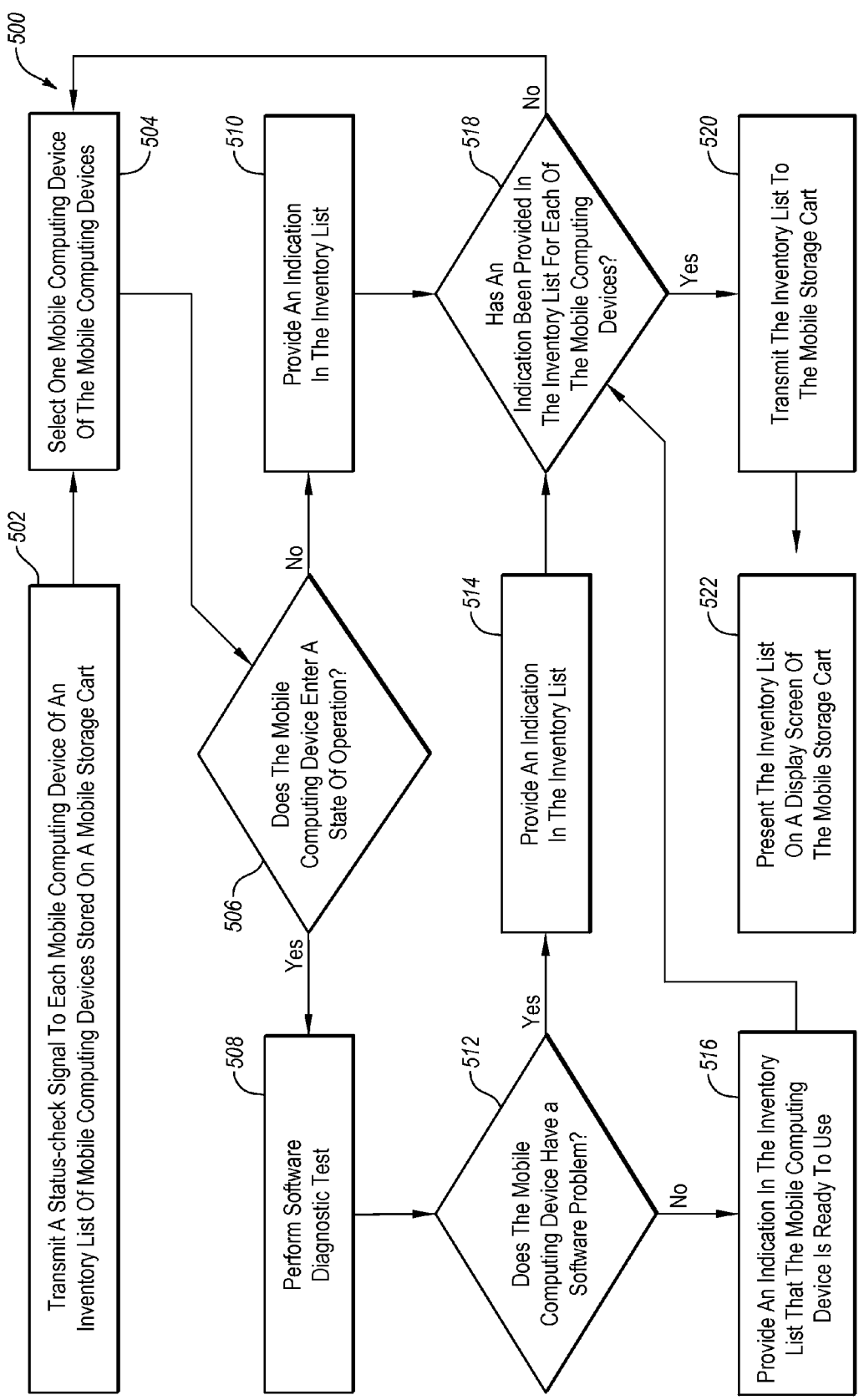
FIG. 5 is a flow diagram of an example method to manage an inventory list of mobile computing devices stored on a mobile storage cart.

In some embodiments, both the inventory module 316 and the inventory module 334 may be associated with one or more operations related to management of an inventory list of mobile computing devices 318 stored on the mobile storage cart 302 as described with respect to FIGS. 2 and 5. In some embodiments, all operations related to management of the inventory list of mobile computing devices 318 may be associated with the inventory module 334. In these and other embodiments, the ILM system 300 may not include the computing system 304.

In some embodiments, the external server 322 may be connected to the mobile storage cart 302 via a network 336. In some embodiments, the communication unit 312 may be configured to transmit and receive data from the external server 322 via the network 336. In some embodiments, the network 336 may be a same network as the network 320. In some embodiments, the network 336 may be a different network from the network 320. For example, in some embodiments, the mobile storage cart 302 may be connected to a local network of a premises, such as a school, and may also be connected to a network beyond the premises, such as, for example, the Internet. In some embodiments, the network 320 may include a LAN, while the network 336 may include a WAN.

In some embodiments, the external server 322 may be associated with a manufacturer of the mobile storage cart 302 and/or a manufacturer of the mobile computing devices 318. Modifications, additions, or omissions may be made to the ILM system 300 without departing from the scope of the present disclosure.

Figure 4:
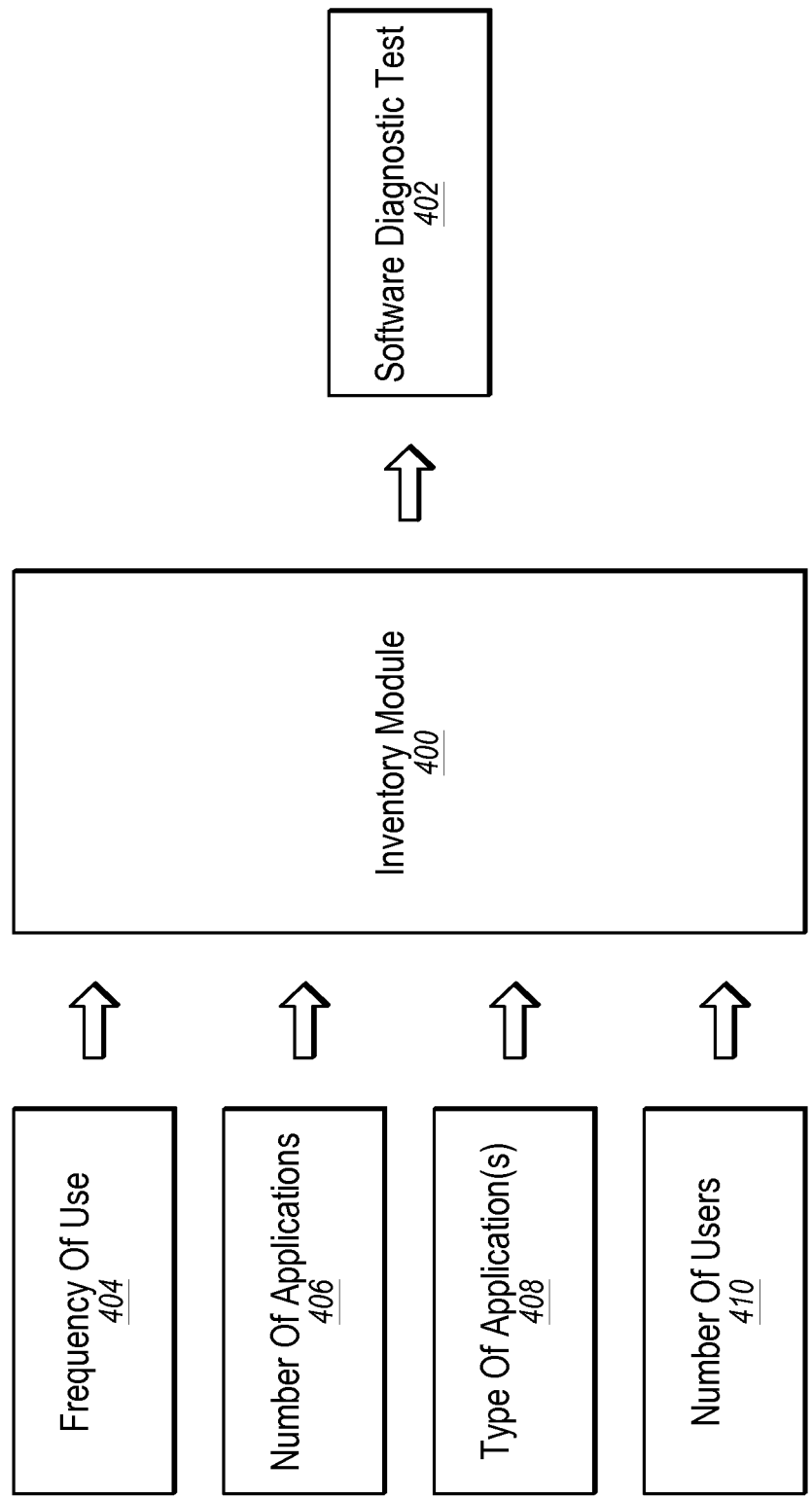
FIG. 4 is a diagram representing an example inventory module configured to create a software diagnostic test.

FIG. 4 is a diagram representing an example inventory module 400 configured to create a software diagnostic test 402, arranged in accordance with at least one embodiment described in the present disclosure. In some embodiments, the software diagnostic test 402 may be performed on one or more mobile computing devices stored on a storage cart. In some embodiments, the software diagnostic test 402 may be performed on a particular mobile computing device of the mobile computing devices in response to a determination by the inventory module 400 that the mobile computing device enters a state of operation when a status-check signal is transmitted to the mobile computing device. In some embodiments, the inventory module 400 may be configured to create the software diagnostic test 402 based on one or more of the following: a frequency of use 404 of the mobile computing devices, a number of software applications 406 used on the mobile computing devices, a type of software application or applications 408 used on the mobile computing devices, and a number of users 410 of the mobile computing devices, among other factors. Modifications, additions, or omissions may be made to inventory module 400 without departing from the scope of the present disclosure.

FIG. 5 is a flow diagram of an example method 500 of managing an inventory list of mobile computing devices stored on a mobile storage cart, arranged in accordance with at least one embodiment described in the present disclosure. One or more operations associated the method 500 may be implemented, in some embodiments, by the computing system 204 of FIG. 2. Similarly, one or more operations associated the method 500 may be implemented, in some embodiments, by the computing system 304 and/or the computing system 326 of FIG. 3. For example, the processor 206 of FIG. 2 may be configured to perform one or more of the operations associated with the method 500 by executing program instructions of the inventory module 216. Also, for example, the processor 306 of FIG. 3 may be configured to perform one or more of the operations associated with the method 500 by executing the program instructions of the inventory module 316, and/or the processor 328 of FIG. 3 may be configured to perform one or more operations associated with the method 500 by executing the program instructions of the inventory module 334. Although illustrated as discrete blocks, various blocks may be divided into additional blocks, combined into fewer blocks, or eliminated, depending on the desired implementation.

The method 500 may begin at block 502, where a status-check signal may be transmitted over a network to each of the mobile computing devices of the inventory list of mobile devices stored on the mobile storage cart. In some embodiments, the network may include or correspond to the network 220 of FIG. 2, the network 320 of FIG. 3, or the network 336 of FIG. 3. Also, in some embodiments, the mobile computing devices may include or correspond to the mobile computing devices 218 of FIG. 2 or the mobile computing devices 318 of FIG. 3. Further, in some embodiments, the mobile storage cart may include or correspond to the mobile storage cart 202 of FIG. 2 or the mobile storage cart 302 of FIG. 3.

In some embodiments, the status-check signal may be transmitted over the network to each of the mobile computing devices of the inventory list at a scheduled time to perform a status check on the mobile computing devices. In some embodiments, the status-check signal may indicate to each of the mobile computing devices to enter a state of operation that allows communication over the network. In these and other embodiments, when a particular mobile computing device enters the state of operation in response to transmission of the status-check signal, it may be turned on or awakened from a reduced power state, such as standby, hibernate, or off. In response to transmission of the status-check signal, the particular mobile computing device in the reduced power state may awaken as if a power button on the mobile computing devices were pressed. The particular mobile computing device may not have a network connectivity problem or a power problem if the mobile computing device is awakened in response to transmission of the status-check signal to the particular mobile computing device. It may be determined that the mobile computing device is awakened based on receiving a response to the status-check signal from the mobile computing device. Failure of the particular mobile computing device to awaken in response to transmission of the status-check signal may indicate the particular mobile computing device has the network connectivity problem and/or the power problem.

In these and other embodiments, the status-check signal may be generated by the inventory module 216, the inventory module 334, or the inventory module 400. The status-check signal may be transmitted by the inventory module 216 via the communication unit 212. The status-check signal may be transmitted to the mobile computing devices in order to determine if the mobile computing devices connect to the network and have functioning power supplies to allow the mobile computing devices to turn on for use.

In some embodiments, the status-check signal may include a Wake on LAN (WOL) signal, a Wake on WAN (WoW) signal, a Wake on MAN (WoM) signal, a Wake on Wireless LAN (WoWLAN) signal, or other status-check signal. In some embodiments, the status-check signal may include a magic packet, which may be sent to each of the mobile computing devices over a network connection, for example a LAN, WAN, MAN, WLAN, or other network connection. The magic packet may be directed to a media access control (MAC) address of each of the mobile computing devices.

At block 504, a particular mobile computing device of the mobile devices stored on the mobile storage cart may be selected. Block 504 may be followed by block 506.

At block 506, it may be determined whether the particular mobile computing device of the mobile computing devices enters the state of operation in response to transmission of the status-check signal. It may be determined that the particular mobile computing device enters the state of operation based on the particular mobile computing device responding to the status-check signal. For example, the particular mobile computing device may power-up and generate a response signal. The particular mobile computing device may send the response signal to a network address in the status-check signal. The receipt of the response signal may indicate that the particular mobile computing device powered-up and is connected to the network.

Block 506 may be followed by block 508 if it is determined that the particular mobile computing device enters the state of operation ("Yes" at block 506) or by block 510 if it is determined that the particular mobile computing device does not enter the state of operation ("No" at block 506).

At block 508, a software diagnostic test may be performed on the particular mobile computing device. In some embodiments, the software diagnostic test may be pre-installed on the mobile computing device or downloaded and installed on the mobile computing device for present and future execution. In these and other embodiments, the software diagnostic test may be directly to run through the network connection. The results of the software diagnostic test may then be provided over the network. In some embodiments, the software diagnostic test may be downloaded and run as an executable on the mobile computing device each time that the software diagnostic test is run.

In some embodiments, the software diagnostic test may be performed on any type of software on the mobile computing device. For example, the software diagnostic test may be performed on one or more of the following: application software, system software, and computer programming tools. In some embodiments, the software diagnostic test may be performed on educational software. For example, the software diagnostic test may be performed on one or more of the following: graphic software, reference software, drill and practice software, tutorial software, educational game software, simulation software, special needs software, and math problem solving software, among other software applications.

At block 510, an indication may be provided in the inventory list in response to the particular mobile computing device failing to enter the state of operation. In some embodiments, the indication may include a general indication that indicates that the particular mobile device has a problem or limited functionality. For example, as illustrated in FIG. 6, an indication 602 such as "problem," "needs check," or "check" may indicate generally that the particular mobile device has limited functionality. In some embodiments, the indication may include a specific indication that indicates a specific problem, such as a status-check signal failure. In some embodiments, a status check signal failure may occur when the particular mobile computing device fails to turn on or awaken from a reduced power state such as standby, hibernate, or off in response to transmission of the status check signal. In some embodiments, when the particular mobile computing device fails to enter the state of operation, a packet analyzer may be used to determine whether there is a power and/or network connection problem, and the specific indication may indicate the power and/or network connection problem. In some embodiments, the packet analyzer may confirm that the status-check signal is visible to the particular mobile computing device's network interface card and may differentiate a power problem from a network connection problem.

Block 508 may be followed by block 512. At block 512, it may be determined if the particular mobile computing device has a software problem based on the results of the software diagnostic test. In some embodiments, it may be determined that the particular mobile computing device has a software problem based on data and/or a signal received from the particular mobile computing device by the computing system 304 and/or the computing system 326, after the software diagnostic test has been performed.

Block 512 may be followed by block 514 if it is determined that the particular mobile computing device has a software problem ("Yes" at block 512) or by block 516 if it is determined that the particular mobile computing device does not have a software problem ("No" at block 512).

At block 514, in response to determining the particular mobile computing device has a software problem, an indication may be provided in the inventory list. In some embodiments, a general indication may be provided in the inventory list that indicates generally that the particular mobile device has a problem or limited functionality. For example, as illustrated in FIG. 7, an indication 602 such as "problem," "needs check," or "check" may indicate generally that the particular mobile device has limited functionality. In some embodiments, a specific indication may be provided in the inventory list. In some embodiments, the specific indication provided in the inventory list may indicate a software problem or a specific type of software problem. In some embodiments, a specific type of software problem may include a problem with a particular software application.

At block 516, in response to determining the particular mobile computing device does not have a software problem, an indication may be provided in the inventory list that the mobile computing device is ready to use. For example, as illustrated in FIG. 6, an indication 602 such as "OK" may indicate the mobile device is ready to use.

Each of the blocks 510, 514, and 516 may be followed by block 518. At block 518, it may be determined whether an indication has been provided in the inventory list for each of the mobile computing devices. Block 518 may be followed by block 520 if it is determined that an indication has been provided in the inventory list for each of the mobile computing devices ("Yes" at block 518) or by block 504 if it is determined that an indication has not been provided in the inventory list for each of the mobile computing devices ("No" at block 518). Thus, in some embodiments, the method 500 may be repeated starting at block 504 for each of the mobile computing devices until an indication has been provided in the inventory list for each of the mobile computing devices.

At block 520, the inventory list may be transmitted to a display screen of the mobile storage cart. In some embodiments, the inventory list that is transmitted may include the indication provided at block 510, 514, or 516 for each of the mobile computing devices.

In some embodiments, the inventory list may also be transmitted over the network to a party that repairs the mobile computing devices or that coordinates repair of the mobile computing devices, such as, for example, a manufacturer of the mobile computing devices or a school's IT office. In some embodiments, the inventory list that is transmitted may include the indication provided at block 510, 514, or 516 for each of the mobile computing devices. Reporting a status of the mobile computing devices by transmitting the inventory list to the party that repairs the mobile computing devices or that coordinates repair of the mobile computing devices may aid in quick repair of one or more of the mobile computing devices.

Block 520 may be followed by block 522. At block 522, the inventory list may be presented on the display screen of the mobile storage cart. In some embodiments, the inventory list that is presented on the display screen may include the indications provided at block 510, 512, or 516 for each of the mobile computing devices. In some embodiments, a simplified version of the inventory list may be presented that includes only general indications. For example, while the inventory list may include one or more specific indications such as "software problem," a simplified version of the inventory list including a general indication, such as "check" or "problem" in place of the specific indications may be presented on the display screen.

It is noted that for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may transmit the inventory list to the mobile storage cart in response to an indication being provided in the inventory list for each of a subset of the mobile computing devices. In some embodiments, an indication may be determined and provided in the inventory list for one or more of the mobile computing devices at the same time as opposed to sequentially. In these and other embodiments, the block 504 may not be used, rather the states of the mobile computing devices may be determined in any order, at the same time, or differing times. For example, while it is determined whether one mobile computing device has entered a state of operation another mobile computing device may be performing a software diagnostic test.

FIG. 6 illustrates an example inventory list 600 that may be presented on a display screen of a mobile storage cart, arranged in accordance with at least one embodiment described in the present disclosure. In some embodiments, an indication 602 may be provided next to a representation 604 corresponding to a particular mobile computing device of the mobile computing devices. The representation 604 may include, for example, a name, number, or symbol. While the indications 602 illustrated in FIG. 6 may include general indications, the inventory list 600 may include specific indications in addition to or instead of general indications. Examples of general indications may include "ready to use," "OK," "check," "needs check," "repair," "needs repair," "limited functionality," "not working," "don't use," or "problem." Examples of specific indications may include "software problem" or "educational software problem."

While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to manage an inventory list of a plurality of mobile computing devices stored on a mobile storage cart, the method comprising:

transmitting a status-check signal over a network to each of a plurality of mobile computing devices of an inventory list at a scheduled time to perform a status check on the plurality of mobile computing devices, wherein the status-check signal indicates to each of the plurality of mobile computing devices to enter a state of operation that allows communication over the network;

determining whether each of the plurality of mobile computing devices enter the state of operation in response to transmission of the status-check signal to each of the plurality of mobile computing devices;

in response to determining that a mobile computing device of the plurality of mobile computing devices does not enter the state of operation, providing an indication in the inventory list that the mobile computing device has limited functionality based on not entering the state of operation;

transmitting the inventory list to a mobile storage cart over the network, wherein the storage cart stores and charges the plurality of mobile computing devices; and presenting the inventory list on a display screen of the storage cart with the indication that the mobile computing device has limited functionality.

2. The method of claim 1, further comprising:

in response to determining that the mobile computing device of the plurality of mobile computing devices enters the state of operation, performing a software diagnostic test on the mobile computing device and determining based on results of the software diagnostic test whether software on the mobile computing device has a software problem;

in response to determining that the software on the mobile computing device does not have the software problem, providing an indication in the inventory list that the mobile computing device is ready to use; and in response to determining that the mobile computing device has the software problem based on the results of the software diagnostic test, providing the indication in the inventory list that the mobile computing device has limited functionality.

3. The method of claim 2, further comprising:

performing the software diagnostic test on other mobile computing devices of the plurality of mobile computing devices that enter the state of operation;

determining whether each of the other mobile computing devices have the software problem or another software problem; and providing an indication in the inventory list for each of the other mobile computing devices that do not have the software problem or the other software problem that the other mobile computing devices are ready to use.

4. The method of claim 2, further comprising creating the software diagnostic test to run on the plurality of mobile computing devices based on one or more of the following: a frequency of use of the plurality of mobile computing devices, a number of applications run on the plurality of mobile computing devices, a type of application run on the plurality of mobile computing devices, and a number of users of the plurality of mobile computing devices.

5. The method of claim 1, further comprising transmitting the inventory list over the network to a party that repairs the plurality of mobile computing devices or that coordinates repair of the plurality of mobile computing devices.

6. The method of claim 1, further comprising detecting user input into a field of a user interface of the display screen, wherein the user input includes the scheduled time to perform the status check.

7. The method of claim 1, further comprising receiving from a user the scheduled time to perform the status check, wherein the user inputs the scheduled time with a user device connected to the network.

8. A system to manage an inventory list of a plurality of mobile computing devices stored on a mobile storage cart, the system comprising:
a mobile storage cart for storing and charging a plurality of mobile computing devices, the storage cart including a processor configured to:
transmit a status-check signal over a network to each of the plurality of mobile computing devices of an inventory list at a scheduled time to perform a status check on the plurality of mobile computing devices, wherein the status-check signal indicates to each of the plurality of mobile computing devices to enter a state of operation that allows communication over the network;
determine whether each of the plurality of mobile computing devices enter the state of operation in response to transmission of the status-check signal to each of the plurality of mobile computing devices;
in response to determining that a mobile computing device of the plurality of mobile computing devices does not enter the state of operation, provide an indication in the inventory list that the mobile computing device has limited functionality based on not entering the state of operation; and
present the inventory list on a display screen of the storage cart with the indication that the mobile computing device has limited functionality.

9. The system of claim 8, wherein the processor is further configured to:
in response to determining that the mobile computing device of the plurality of mobile computing devices enters the state of operation, perform a software diagnostic test on the mobile computing device and determine based on results of the software diagnostic test whether software on the mobile computing device has a software problem;
in response to determining that the software on the mobile computing device does not have the software problem, provide an indication in the inventory list that the mobile computing device is ready to use; and
in response to determining that the mobile computing device has the software problem based on the results of the software diagnostic test, provide an indication in the inventory list that the mobile computing device has limited functionality.

10. The system of claim 9, wherein the processor is further configured to:
perform the software diagnostic test on other mobile computing devices of the plurality of mobile computing devices that enter the state of operation;
determine whether each of the other mobile computing devices have the software problem or another software problem; and
provide an indication in the inventory list for each of the other mobile computing devices that do not have the software problem or the other software problem that the other mobile computing devices are ready to use.

11. The system of claim 9, wherein the processor is further configured to create the software diagnostic test to run on the plurality of mobile computing devices based on one or more of the following: a frequency of use of the plurality of mobile computing devices, a number of applications run on the plurality of mobile computing devices, a type of application run on the plurality of mobile computing devices, and a number of users of the plurality of mobile computing devices.

12. The system of claim 8, wherein the display screen includes a user interface.

13. The system of claim 12, wherein the processor is further configured to detect user input into a field of the user interface, wherein the user input includes the scheduled time to perform the status check.

14. The system of claim 8, wherein the processor is further configured to receive from a user the scheduled time to perform the status check, wherein the user inputs the scheduled time with a user device connected to the network.

15. One or more non-transitory computer-readable media that include computer-readable instructions stored thereon that are executable by one or more processors to perform or control performance of operations, the operations comprising:
transmitting a status-check signal over a network to each of a plurality of mobile computing devices of an inventory list at a scheduled time to perform a status check on the plurality of mobile computing devices, wherein the status-check signal indicates to each of the plurality of mobile computing devices to enter a state of operation that allows communication over the network;
determining whether each of the plurality of mobile computing devices enter the state of operation in response to transmission of the status-check signal to each of the plurality of mobile computing devices;
in response to determining that a mobile computing device of the plurality of mobile computing devices does not enter the state of operation, providing an indication in the inventory list that the mobile computing device has limited functionality based on not entering the state of operation; and
transmitting the inventory list to a storage cart over the network, wherein the storage cart stores and charges the plurality of mobile computing devices; and
presenting the inventory list on a display screen of the storage cart with the indication that the mobile computing device has limited functionality.

16. The non-transitory computer-readable media of claim 15, wherein the operations further comprise:
in response to determining that the mobile computing device of the plurality of mobile computing devices enters the state of operation, performing a software diagnostic test on the mobile computing device and determining based on results of the software diagnostic test whether software on the mobile computing device has a software problem;
in response to determining that the software on the mobile computing device does not have the software problem, providing an indication in the inventory list that the mobile computing device is ready to use; and
in response to determining that the mobile computing device has the software problem based on the results of the software diagnostic test, providing an indication in the inventory list that the mobile computing device has limited functionality.

17. The non-transitory computer-readable media of claim 16, wherein the operations further comprise creating the software diagnostic test to run on the plurality of mobile computing devices based on one or more of the following: a frequency of use of the plurality of mobile computing devices, a number of applications run on the plurality of mobile computing devices, a type of application run on the mobile computing devices, and a number of users of the mobile computing devices.

18. The non-transitory computer-readable media of claim 15, wherein the display screen includes a user interface.

19. The non-transitory computer-readable media of claim 18, wherein the operations further comprise detecting user input into a field of the user interface, wherein the user input includes the scheduled time to perform the status check.

20. The non-transitory computer-readable media of claim 15, wherein the operations further comprise receiving from a user the scheduled time to perform the status check, wherein the user inputs the scheduled time with a user device connected to the network.

* * * * *